3,274,255
OXIDATION OF ISOBUTYLENE TO
METHACROLEIN
William F. Brill, Skillman, and Alfio J. Besozzi, East Brunswick, N.J., assignors to Petro-Tex Chemical Corporation, Houston, Tex., a corporation of Delaware
No Drawing. Filed June 27, 1963, Ser. No. 290,912
5 Claims. (Cl. 260—604)

This invention relates to a process for producing unsaturated aldehydes and relates more particularly to a temperature controlled process for oxidizing isobutylene to methacrolein.

Although it is known that olefins may be oxidized to unsaturated aldehydes in vapor phase in the presence of a copper catalyst, such olefin oxidation reactions are generally conducted at temperatures below 400° C. It would be preferred to conduct these oxidation reactions at temperatures above 400° C. to increase the space time yields of the reaction. At these elevated temperatures there is considerable cracking and formation of large amounts of combustion products, particularly when isobutylene is the olefin feed. In an attempt to solve this problem large quantities of diluent have been tried for controlling these high temperature oxidation reactions; however, this technique is generally unacceptable since this not only reduces the space time yields but also requires complicated and expensive product recovery systems.

It is an object of this invention to provide an improved high temperature process for producing high yields of methacrolein from isobutylene over a copper type catalyst. Another object is to provide an oxidation process which requires a minimum of diluent yet averts uncontrolled oxidation or cracking of the olefin feed. Other objects will be apparent from the description which follows. These objects are attained by reacting isobutylene with oxygen over a copper phosphate type catalyst which is treated with an organic polyhalide compound. When the reaction is conducted over such treated catalyst, a controlled high temperature oxidation of isobutylene is possible and high yields of methacrolein are obtained.

According to this invention unsaturated aldehydes and particularly methacrolein may be produced by contacting at temperatures above 400° C. a mixture of isobutylene and oxygen with a copper phosphate catalyst activated with an organic polyhalide compound. This invention is to be distinguished from processes requiring the continued presence of inorganic or organic halides during the reaction. In accordance with this invention, only a small amount of an organic polyhalide is used to treat and activate the copper phosphate oxidation catalyts and continued presence of an organic polyhalide during the reaction is detrimental to continued high yields of the desired product.

While the type of organic halogen-containing compound utilized for catalyst activation is somewhat specific, organic polyhalide compounds containing at least 2 carbon atoms and less than 10 carbon atoms may be used. Preferably the organic polyhalide compound will be an aliphatic derivative containing from 2 to 6 carbon atoms and from 2 to 6 halogen atoms, and more preferably that at least one of the halogen atoms be a bromine atom. While any such organic polyhalide may be used to activate the copper phosphate type catalyst, organic bromides are usually preferred. Typical compounds include ethylene dibromide, trimethylene bromide, tetramethylene bromide, pentamethylene bromide, ethylidene bromide, tetrabromoethane, and the like. Trimethylene bromide and ethylene dibromide have been found to be very effective in not only activating the catalyst, thereby improving the isobutylene conversion and selectivity to methacrolein, but also are effective in providing a catalyst which retains this increased activity for long periods of time.

The catalyst employed in this invention is a copper phosphate type catalyst. The catalyst actives may be prepared by combining copper atoms in the form of copper salts, oxides, and hydroxides with phosphorus atoms in the form of its acids, oxides, or salts which are then heated to form oxides and phosphates. Normally, copper will be present in the catalyst mixture in excess of the phosphorus. While atomic ratios of copper to phosphorus of less than 1:1 have been used, normally ratios greater than 1:1 to less than 10:1 are used. Ratios of copper atoms to phosphorus atoms in the catalyst of about 1:1 to about 3:1 are preferred. Specific methods of preparing the catalyst include reaction of a copper sulfate with sodium pyrophosphate in aqueous solution; reacting cupric oxide with concentrated phosphoric acid; reacting phosphorus pentoxide with either a cuprous or cupric hydroxide; by evaporating a solution of cupric nitrate and phosphoric acid onto a support and heating, and the like. Such catalysts may contain mixtures of copper phosphates, copper oxides and phosphorus oxides. Some of the catalysts so prepared initially contain a mixture of copper orthophosphates, copper pyrophosphates, copper metaphosphates, cuprous and cupric oxides. After activation it is believed that the copper-phosphorus catalyst is essentially an admixture of cupric orthophosphate and copper and phosphorus oxides. During the oxidation reaction the copper-phosphorus catalyst may undergo additional chemical and physical changes, but these changes have no apparent adverse effect on the catalysts' activity. In any case, however, when the copper and phosphorus are combined and treated with the organic polyhalide, its activity for oxidizing isobutylene to methacrolein is unexpectedly improved and enhanced.

The catalyst actives may be deposited on a variety of supports such as alumina, quartz, silicon carbide, and other well known catalyst supports. The catalyst actives comprising a mixture containing copper and phosphorus atoms may be deposited on the catalyst supports from aqueous slurries or the supports may be impregnated as from salt solutions. If desired, the catalyst may be pelletized and used as such; however, a catalyst support is generally more economical and is usually preferred. The amount of catalyst actives on a support may be varied quite widely, but normally will be from about 1 to 25 weight percent and more usually about 5 to 15 weight percent.

The copper phosphate may be activated by a variety of methods. Generally the catalyst is activated by passing an organic polyhalide over the catalyst at a temperature ranging from 200° C. to 700° C. and preferably at a temperature between 400° C. and 600° C. The presence of other materials or compounds during the activation process such as olefins, oxygen, or various inert diluents has no adverse effect upon the catalyst activation process. The mixing of the organic polyhalide with one or more of the reactants has been found to be a convenient method of activation; however, the presence of the organic polyhalide with the reactants tends to suppress the oxidation reaction and the production of methacrolein during this activation period.

Generally the amount of organic polyhalide added will vary over wide limits depending on whether a cyclic or a continuous activation process is employed. Amounts as high as 1 to 1 weight ratios of the organic polyhalide to the catalyst actives may be used. However, such high ratios are not essential to the operation of this invention. Normally, organic polyhalides in amounts of between 0.01 percent and 10 percent by weight of the catalyst actives have been most effective. Organic polyhalides in amounts as low as 0.0005 percent by weight of the catalyst actives have been used and improved methacrolein selectivities were obtained. The use of organic polyhalides, such as trimethylene bromide, in amounts between 1 to 5 percent by weight of catalyst actives passed over a copper phosphate catalyst at temperatures ranging from 400° C. to 600° C. with activation times varying from 10 minutes to several hours is the preferred means of activation. Normally the copper phosphate catalyst will be sufficiently activated with exposure times of about one hour. When lower amounts of organic polyhalides are employed, such as 0.01 percent to 0.1 percent by weight of the catalyst actives, longer activation times may be required. The activation time may be defined as the length of time catalyst actives are in contact with the organic polyhalides. Other factors may affect the activation time required for complete catalyst activation. For example, the temperature of activation, the volume of organic polyhalides passed over the catalyst per unit time, selection of organic polyhalide, rate of organic polyhalide consumption, and the like, all affect to some degree the time required for complete catalyst activation. Such variation is within the capabilities of those skilled in the art.

It was surprising to find that, when the organic polyhalide is added as part of the reactant mixture at reaction temperature, the oxidation reaction is suppressed. For example, a mixture of isobutylene, oxygen, steam, and small amounts of trimethylene bromide was passed over a copper phosphate catalyst at about 550° C. The analysis indicated that lower yields of methacrolein were obtained under these conidtions than were obtained over a copper phosphate catalyst that was previously separately activated. However, after operating under these conditions for about 3 hours, the addition of trimethylene bromide was stopped and immediately thereafter a substantial increase in yield was detected. Another novel feature of this invention is the fact that intermittent activation periods are not normally required. Once the catalyst has been activated, the catalyst usually will maintain its enhanced activity, under normal operating conditions, for the life of the catalyst. However, if the catalyst is deactivated as by inadvertently introducing a catalyst poison, the catalyst may be reactivated by any of the methods previously described.

The amount of oxygen utilized in oxidizing isobutylene to methacrolein will vary over narrow limits. Amounts between about 0.1 and 3 mols of oxygen per mol of isobutylene may be used, and amounts between 0.5 and 1.2 mols of oxygen per mol of isobutylene are preferred. The oxygen may be added as elemental oxygen or as a mixture such as air. The choice of oxygen ratio will generally depend upon the operational conditions of reaction and particularly upon the choice of reaction zone temperatures. Normally the amount of oxygen added is decreased as the reaction zone temperature is increased. One of the advantages of this invention is that relatively high ratios of oxygen to isobutylene may be used at high operating temperatures without producing excessive amounts of combustion products.

Temperatures between about 450 and 700° C. have been most useful in the production of methacrolein in accordance with this invention; however, temperatures ranging from about 500° C. to 650° C. are preferred. These operational temperatures are the highest temperatures present in the reaction zone during the oxidation reaction. Another important advantage of this invention is in the use of relatively high set temperatures without causing a runaway or uncontrolled oxidation reaction. Set temperature may be defined as the temperature of the reaction zone prior to the introduction of the oxidation reactants. In the past, when a copper phosphate catalyst was utilized at set temperatures of 400° C. a runaway or uncontrolled exothermic oxidation reaction generally resulted. In contrast, it is now possible to utilize set temperatures of from 400° C. to 600° C. without initiating a runaway oxidation effect by operating in accordance with this invention.

Still another advantage of this invention is that only minor amounts of diluent are required at these high temperatures. This advantage is important from the standpoint of heat conservation and at the same time increasing the space time yields. Although the amount of diluent added may be as low as 1 mol of inert diluent per mol of isobutylene and as high as 30 mols of diluent per mol of isobutylene, mol ratios of less than 10 mols of inert diluent per mol of isobutylene are generally used. The diluent utilized will generally be in an amount such that the amount of isobutylene present in the total reaction mixture will not be less than 10 mol percent. In fact, rich isobutylene streams of between 10 to 20 mol percent based on the total volume of reaction mixture have given excellent yields of methacrolein even at high operating temperatures. It was unexpectedly found that these rich isobutylene streams improved rather than hindered increased methacrolein selectivities. In the absence of the copper phosphate catalyst treatment, isobutylene streams of 10 to 20 mol percent concentration were generally too rich, particularly at temperatures above 400° C., and uncontrolled oxidation reactions with high yields of combustion products generally resulted.

The diluents that may be utilized in this invention includes any inert material that will not react with the feed, reactants, or reaction products. Diluents such as helium, nitrogen, carbon dioxide, steam, methane, and the like have been used to advantage. The contact times required in the operation of this invention are much shorter than that generally required for oxidation reactions of this type. Contact time or residence time may be defined as the calculated dwell time the reactants spend in the reaction zone at reaction temperature and pressure, assuming that the volume of feed and the volume of reaction products remain constant. Contact times as low as 0.005 seconds to one second have been utilized to advantage. However, contact times between 0.05 and 0.5 second are preferred. These lower contact times coupled with the utilization of rich isobutylene streams greatly improved the space time yields. Space time yields are the ratio of product yield per unit volume of catalyst per unit of time. Space time yields as high as 574 grams of methacrolein per liter of catalyst per hour have been obtained by the process of this invention. Prior to this invention other processes produced space time yields of only about 35.0 grams of methacrolein per liter of catalyst per hour and space time yields above 70 grams/liter/hour could be obtained only by sacrificing large quantities of feed material to combustion products.

A variety of reactors may be used in the practice of this invention. Generally large diameter reactors which can be easily charged and emptied of catalyst are preferred. Small diameter tubular reactors may also be used. Any desired reactor that can be efficiently operated without creating flow restrictions or back pressures may be used and good results obtained. A fluidized bed reactor may also be advantageously used. In the practice of this invention the process is preferably carried out by placing the catalyst in a reactor, heating the reactor to set temperatures of between 400° C. and 600° C. and passing a mixture of olefin, oxygen, and steam through the reactor and over the catalyst. As the reactants enter the heated reaction zone containing the copper phosphate catalyst, an exothermic oxidation reaction results. The temperature immediately rises to a reaction temperature of between 450° C. and 700° C. The mixture may be passed in a straight run through the reactor and the methacrolein produced separated from the reaction product. In one method of operation, the unconverted isobutylene may be removed from the reaction effluent by extraction with a solvent and returned to the reactors. In another method of operation, part of the reaction products consisting mainly of isobutylene, oxygen, steam and some combustion products may be recycled with the reaction feed after the methacrolein has been separated. Fresh quantities of isobutylene, steam and oxygen may be added to this recycle mixture.

Specific embodiments of the invention are incorporated in the following examples. Percent conversion refers to the mols of isobutylene consumed per 100 mols of isobutylene fed to the reactor. Percent yield refers to mols of methacrolein formed per 100 mols of isobutylene consumed. All runs reported in the examples were made in a stainless steel block reactor having an internal diameter of 22 mm. and a length of 24 inches. Heat was supplied to the reactor by means of strip heaters vertically placed about the stainless steel block reactor. The uppermost portion of the reactor was used as a preheat section for the reaction zone which was located directly below the preheat section. In these examples the preheat section was empty. The reactants were preheated in the preheat section of the reactor prior to their passage into the reaction zone. The effluent gases were periodically sampled through a sampling port located just below the heated section of the reactor by means of an insulated syringe maintained at a temperature of above 160° C. In analyzing the effluent stream two chromatographic samples were taken; one was analyzed for the methacrolein produced and the second was analyzed for the gases, nitrogen, oxygen, and carbon monoxide.

A catalyst was prepared by impregnating 315 grams of Alundum support having a Tyler screen size of from 10 to 12 with an aqueous solution containing 41.7 grams of $Cu(NO_3)_2 \cdot 3H_2O$ and 11.2 grams of commercial $H_3PO_4$. The mixture was evaporated to dryness under vacuum in a rotating tumbler which was maintained at a temperature of between 65° C. to 75° C. After the catalyst was completely dry, the catalyst fines were removed by sifting. The catalyst was then placed in a tube and heated at 550° C. in the presence of oxygen for about 16 hours. 13.3 cc. of this prepared catalyst was then placed in the lowermost portion of the stainless steel reactor tube and heated to a temperature of about 500° C. A 19 inch section located above the catalyst bed was left empty and utilized as a preheat zone. A mixture consisting of 10 volume percent isobutylene, 7.5 volume percent oxygen, 85 volume percent steam and 0.5 volume percent trimethylene bromide was passed through the reactor. The contact time was 0.1 second. The hot spot or reaction temperature was approximately 577° C. Chromatographic analysis of the hot effluent indicated that a methacrolein yield of 59.7 percent based on the isobutylene consumed was obtained. After running for about an hour under the above reported conditions the trimethylene bromide was eliminated from the reaction feed. The remaining reactants consisting of isobutylene and oxygen were continually fed into the reaction zone. After running for about 3 hours more, chromatograph samples were taken and analyzed. The chromatographic analysis showed still higher yields of methacrolein based on the isobutylene consumed. After running for several more hours over the same activated catalyst at a set temperature of 494° C. and a reaction temperature of 535° C. another chromatographic sample was taken. The data showed that a methacrolein yield of 79.8 percent based on the isobutylene consumed was obtained. This yield represented an increase of greater than 33 mol percent over the yield obtained with trimethylene bromide present in the stream. The space time yield for this example was calculated to be 400 grams/liter/hour. These high yields of methacrolein continued for the life of the catalyst. The above example was repeated with ethylene dibromide and similar improved results were obtained.

The above run was repeated at a set temperature of 500° C. except that fresh copper phosphate catalyst prepared as described was used, and the catalyst was not treated with trimethylene bromide at any time prior to or during the run. Analysis of the hot reactor effluent indicated that only 20.4 percent of the isobutylene introduced was consumed and that 47.8 percent of the isobutylene was converted to methacrolein for a yield of methacrolein of about 9.4 percent. Upon completion of this run the catalyst was examined and was found to be coated with carbon and coke and large quantities of combustion products were produced. In contrast there was no indication of coking or carbon on the treated catalyst, nor was an excessive amount of CO or $CO_2$ formed. Although a set temperature of 500° C. was utilized in this example over the non-treated catalyst, a hot spot temperature of 660° C. was obtained. By using a set temperature of 494° C. in the first run under identical operating conditions, but over the activated or conditioned catalyst, a reaction temperature of only 535° C. was obtained. This reaction temperature was 125° C. lower than that experienced in the run with the unactivated catalyst. When bromobutane was added in an attempt to activate the catalyst, no sustained increase in yield was obtained after the activation period.

We claim:
1. A temperature controlled process for producing methacrolein which comprises contacting an isobutylene mixture comprising about 0.5 to 1.2 mols of oxygen per mol of isobutylene and about 1 to 10 mols of an inert diluent per mol of isobutylene at reaction temperatures between about 500° C. to 650° C. from about 0.05 to about 0.5 second with a copper phosphate catalyst containing atoms of copper and phosphorus in an atomic ratio of about 1 to 1 to about 3 to 1 activated at temperatures ranging from 200° C. to 700° C. by contacting the catalyst with an organic polybromide selected from the group consisting of trimethylene bromide and ethylene dibromide in amounts between about 1 to 10 weight percent of the catalyst actives.

2. A process for producing methacrolein which comprises contacting isobutylene at about 0.5 to 3.0 mols of oxygen per mol of isobutylene at reaction temperatures between about 400° and 700° C. for about 0.05 to about 0.5 second with a copper-phosphate catalyst containing atoms of copper and phosphorus in an atomic ratio of copper to phosphorus of about 1 to 1 to 3 to 1, the said catalyst having been activated at temperatures ranging from 200° C. to 700° C. by contacting the catalyst with an organic polybromide compound selected from the group consisting of ethylene dibromide, trimethylene bromide, tetramethylene bromide, pentamethylene bromide, ethylidene bromide and tetrabromoethane.

3. The process of claim 2 wherein the organic polybromide compound is trimethylene bromide.

4. The process of claim 2 wherein the organic polybromide compound is ethylene dibromide.

5. A catalyst useful in oxidizing isobutylene to methacrolein prepared by treating a coppor-phosphorus catalyst containing copper and phosphorus atoms in an atomic ratio of about 1 to 1 to 3 to 1 with an organic polybromide selected from the group consisting of trimethylene bromide and ethylene dibromide at a temperature in the range of about 200° C. to 700° C. for a period of time greater than about 10 minutes.

References Cited by the Examiner

UNITED STATES PATENTS

| | | | |
|---|---|---|---|
| 2,198,180 | 4/1940 | Rubin | 252—437 |
| 2,367,877 | 1/1945 | Layng | 252—437 |
| 2,486,842 | 11/1949 | Hearne et al. | 260—604 |
| 3,177,257 | 4/1965 | Detling et al. | 260—604 |

FOREIGN PATENTS

| | | |
|---|---|---|
| 605,502 | 10/1961 | Belgium. |
| 839,808 | 6/1960 | Great Britain. |

LEON ZITVER, *Primary Examiner.*

J. J. SETELIK, R. H. LILES, *Assistant Examiners.*